United States Patent
Daniell et al.

(10) Patent No.: US 9,919,515 B2
(45) Date of Patent: Mar. 20, 2018

(54) PRODUCT ALIGNMENT USING A PRINTED RELIEF

(71) Applicant: Tracer Imaging LLC, White Plains, NY (US)

(72) Inventors: Stephen S. Daniell, Northampton, MA (US); Steven M. Spiro, Chappaqua, NY (US); Daniel L. Lau, White Plains, NY (US)

(73) Assignee: TRACER IMAGING LLC, White Plains, NY (US)

(*) Notice: Subject to any disclaimer, the term of this patent is extended or adjusted under 35 U.S.C. 154(b) by 0 days.

(21) Appl. No.: 15/417,915

(22) Filed: Jan. 27, 2017

(65) Prior Publication Data
US 2017/0217160 A1    Aug. 3, 2017

Related U.S. Application Data

(60) Provisional application No. 62/288,234, filed on Jan. 28, 2016.

(51) Int. Cl.
| | |
|---|---|
| *B41J 2/045* | (2006.01) |
| *G02B 3/00* | (2006.01) |
| *B41J 3/28* | (2006.01) |

(52) U.S. Cl.
CPC ....... *B41J 2/04505* (2013.01); *B41J 2/04586* (2013.01); *B41J 3/28* (2013.01); *G02B 3/005* (2013.01); *G02B 3/0056* (2013.01); *G02B 3/0075* (2013.01)

(58) Field of Classification Search
CPC ...... B41J 2/04505; B41J 2/04586; B41J 3/28; G02B 3/0075; G02B 3/005; G02B 3/0056
See application file for complete search history.

(56) References Cited

U.S. PATENT DOCUMENTS

| | | |
|---|---|---|
| 3,462,226 A | 8/1969 | Huffaker |
| 3,633,301 A | 1/1972 | Calabuig |
| 3,678,833 A | 7/1972 | Leach |
| 4,588,899 A | 5/1986 | Erhardt |
| 5,391,257 A | 2/1995 | Sullivan et al. |
| 5,424,553 A | 6/1995 | Morton |
| 5,473,406 A | 12/1995 | Hassall et al. |

(Continued)

FOREIGN PATENT DOCUMENTS

WO    WO 2015/126481    8/2015

OTHER PUBLICATIONS

US 8,382,272, 02/2013, Suzuki (withdrawn)

*Primary Examiner* — Bradley Thies
(74) *Attorney, Agent, or Firm* — Leason Ellis LLP (57) ABSTRACT

A printing system capable of accurately positioning a lenticular array in registration with a rectilinear raster includes a printer that is capable of printing onto a printable surface. The printer has a main support surface on which the printable surface rests. The system further includes a series of raised parallel relief features being spatially formed along a printable substrate that is supported by the main support surface. The raised parallel relief features are raised to a sufficient height above the printable substrate such that when the lenticular array is disposed upon the raised parallel relief features, each raised parallel relief feature fits and is disposed within a valley formed between two respective adjoining lenticules of the lenticular array.

22 Claims, 7 Drawing Sheets

(56) References Cited

U.S. PATENT DOCUMENTS

| | | | |
|---|---|---|---|
| 5,479,270 A | 12/1995 | Taylor | |
| 5,689,340 A | 11/1997 | Young | |
| 5,699,190 A | 12/1997 | Young et al. | |
| 5,710,666 A | 1/1998 | Mcdonald | |
| 5,764,266 A | 6/1998 | Azuma et al. | |
| 5,822,038 A | 10/1998 | Slater et al. | |
| 5,959,718 A | 9/1999 | Morton | |
| 5,974,967 A | 11/1999 | Bravenec et al. | |
| 6,091,479 A | 7/2000 | Frosig et al. | |
| 6,133,928 A | 10/2000 | Kayashima et al. | |
| 6,177,217 B1 | 1/2001 | Agostinelli et al. | |
| 6,200,713 B1 | 3/2001 | Agostinelli et al. | |
| 6,276,269 B1 | 8/2001 | Bravanec | |
| 6,280,374 B1 | 8/2001 | Manico et al. | |
| 6,346,158 B1 | 2/2002 | Colgan et al. | |
| 6,460,993 B2 | 10/2002 | Pilu | |
| 6,502,324 B2 | 1/2003 | Noguchi et al. | |
| 6,615,150 B1 * | 9/2003 | Nelson | B65H 9/20 271/3.14 |
| 6,682,238 B2 * | 1/2004 | Yraceburu | B41J 11/007 271/276 |
| 6,709,080 B2 | 3/2004 | Nims et al. | |
| 6,721,101 B2 * | 4/2004 | Daniell | G02B 3/005 348/E13.028 |
| 6,763,145 B1 | 7/2004 | Street | |
| 6,795,159 B1 | 9/2004 | Cassara | |
| 7,033,090 B2 | 4/2006 | Damera-venkata | |
| 7,119,963 B1 | 10/2006 | Cassara | |
| 7,154,528 B2 | 12/2006 | Mccoy et al. | |
| 7,400,451 B2 | 7/2008 | Robb et al. | |
| 7,593,132 B2 | 9/2009 | Bast et al. | |
| 8,142,860 B2 | 3/2012 | Vanmaele et al. | |
| 8,272,711 B2 | 9/2012 | Suzuki | |
| 9,021,947 B2 | 5/2015 | Landa | |
| 2002/0114078 A1 | 8/2002 | Halle et al. | |
| 2002/0187215 A1 | 12/2002 | Trapani et al. | |
| 2004/0244901 A1 | 12/2004 | Trapani et al. | |
| 2005/0122489 A1 * | 6/2005 | Suzuki | G03B 35/24 355/22 |
| 2006/0169156 A1 | 8/2006 | Stettner | |
| 2007/0188874 A1 | 8/2007 | Robb et al. | |
| 2010/0007692 A1 * | 1/2010 | Vanmaele | B29C 67/0055 347/21 |
| 2010/0242752 A1 * | 9/2010 | Suzuki | B41J 3/407 101/35 |

* cited by examiner

PRODUCT ALIGNMENT USING A PRINTED RELIEF

CROSS-REFERENCE TO RELATED APPLICATION

The present invention claims the benefit of U.S. patent application Ser. No. 62/288,234, filed Jan. 28, 2016, which is hereby incorporated by reference in its entirety.

TECHNICAL FIELD

The invention relates to the alignment of a prefabricated lenticular lens array to the raster axis of a printing device, such as, a flatbed inkjet printer.

BACKGROUND

In many instances, and particularly for short-run printed graphics, offset lithographic printing has been supplanted by digital printing. Digital printing involves producing an image by localized control of ink distribution, rather than by the use of a mechanically or chemically altered plate. An advantage of digital printing systems is each print can differ, as no mechanical plate is necessary to transfer the image to the target substrate.

Digital printing encompasses various implementations of inkjet printing, but may also include dye sublimation printing, dry or liquid electrostatic printing, or any other method where the colorants are disposed within the printer from information provided by a rasterized digital image.

Digital printers, and particularly those which include a flatbed to support their printable material, and furthermore which cure their inks by ultraviolet (UV) radiation, are of particular interest to the lenticular trade. UV inkjet printers can print directly to plastic materials such as those used in the making of lenticular arrays. UV inkjet printers can often also reverse print process colors and then overlay the process colors with opaque white, so that a complete lenticular print may be devised in a continuous operation.

Effective lenticular printing requires that at least two narrow bands be printed behind and parallel each lens on the flat back side of the lenticular lens sheet. When viewed from the side having the lens relief, the collective effect of the magnified image bands produces an image that changes with the angle of view.

The challenge in aligning a preformed linear lens sheet, such as those commonly prepared for lenticular printing, with any printing device is well known in the trade. Various optical and mechanical methods have been proposed. In a typical optical approach, a printed pattern is observed though the lenses and a positional adjustment is made, either by a human observer or by automation.

In the mechanical approach, a relative state of registration is attained between the structural element of a printer with a known position, such as a roller or table, and the lenticular lens material. The present invention predominantly belongs to the latter class, however, it is understood that visual effects can also be observed that verify correct alignment.

In traditional practice, a lenticular lens is provided by the manufacturer with a precisely cut reference edge. At the printing facility, the reference edge is made to bear against a raised ruler or fence, so that the location of the lens sheet is reliably established as it enters a printing device, such as an offset printing press.

However, the use of a single outer edge as a reference is not ideal, for a number of reasons. First, the reference edge must cut with great precision and consistency, or else the lenticular images, when printed and viewed, will have an irregular and inconsistent appearance.

Also, inconsistencies in lens pitch may arise from imperfect tooling of the lenticular embossing cylinder, variation in the speed and temperature of the extrusion line, environmental factors such as temperature and humidity, or the conditions of its storage. If a single reference edge is used, these errors will be expressed in a cumulative and summary way across the sheet. As a result, it is often the case that the effective center of the finished lenticular image appears to vary from print to print.

It may be appreciated by the foregoing discussion that the optimal case would be one in which the lens material was by some means aligned at its centerline with the printing device. In this circumstance, the registration is optimized at the center of attention, while any variation in the pitch is distributed to either side. Any decorrelation between the lens and the printer is therefore essentially reduced by half, and moved to the periphery of the printed sheet.

There are instances in the Prior Art where such a structural alignment is made between a printer component and the lenticular sheet. In U.S. Pat. No. 3,678,833 to Leach, two ridges on a guide roll fit into preformed channels on a compatibly made lenticular sheet. U.S. Pat. No. 5,764,266 to Azuma et al., fluted or toothed cylinders are used advance the lenticular sheet under a printhead. In U.S. Pat. No. 6,276,269 to Bravanec, a grooved cylinder is used to fix the location of the lens sheet as it passes through a printer. U.S. Pat. No. 6,460,993 to Pilu employs a similar grooved arrangement. In U.S. Pat. No. 9,021,947 Landa, a sheet of lens material having the same pitch as the sheet to be printed is attached to the roller, such that the relief faces of the two lenticular sheets may be held in a meshed state during printing. US20020187215 Trapani proposes fluted platforms so that multiple pieces of lenticular material may be set out in a tray.

However, these solutions are generally adapted to a fixed lens pitch, and cannot be readily adapted to the wide range of available lenticular materials, which can vary from 2.5 mm (~10 lenses per inch) to 0.085 mm (~300 lenses per inch).

SUMMARY

In the invention, a periodic raised relief is printed upon a substrate using a curable compound, or a series of curable compounds. The curable compound may include an ink or an inkset that is cured by the application of ultraviolet or other activating radiation.

Because these inks are typically viscous and are composed of 100% solids, they may be used on an appropriate substrate to provide a structural relief pattern of any design.

The invention is suitable for use with flatbed printers, which may vary from desktop devices to industrial systems. Industrial inkjet devices may have tables that extend several meters in each direction. It may also foreseeably be applied to print rolls in roll-fed systems.

In an expected application of the invention, a preinstalled color inkset, for example, such as those used in CMYK printing device, are used to rapidly build up a set of relief lines that correspond to the anticipated location of the valleys between the lenses on the lenticular sheet.

In a more intricate application of the invention, the cyan, magenta, yellow, and black output may be conscientiously made to differ in width, so that the effect of the overprinting of the four colors is the accumulation of a relief that substantially conforms to the inverse geometry of the anticipated lens array.

The printed lines are expressly formed at the measured physical pitch of the lens array rather than the nominal pitch. The nominal pitch usually differs from the structural pitch, as the nominal pitch usually anticipates a preselected viewing distance.

The set of raised registration lines according to the invention may be printed directly onto the table of a flatbed printer. However, to allow for the accommodation of a variety of pitches, and to reduce labor and avoid wear to the bed, it has been found useful to print the raised line pattern upon a sacrificial substrate. If a vacuum table is used, it is advantageous that the sacrificial material be at least partially permeable to air.

Irrespective of whether the registration pattern is printed on the bed or upon a sacrificial intermediate material, a sheet of lenticular lens material is placed with the lenses facing down upon the surface carrying the raised lines that have been deposited by the printhead. The lens sheet is then shifted until the valleys between the lenses physically engage with the pattern of raised lines. When the relief alignment pattern and the lens relief are of complementary geometry, the lens sheet will naturally seat at a definitive location relative to the bed of the printer. Under certain circumstances, a consistency of color and tone may also be observed through the lens sheet when the lens sheet and the relief lines are in registration.

If a flatbed UV inkjet printer is outfitted with a vacuum table, the vacuum may be applied so that the lenticular sheet is drawn flat and kept immobile during the printing process. It is an aspect of the invention that the digital print files of the raised lines, and of an image interlaced at a nominal pitch for a given viewing distance, are correlated within an electronic device so that they are inherently in registration along their established common centerline.

Typically, the given pitch for the registration pattern will be slightly higher than the pitch of the interlaced image that will eventually be viewed. This difference leaves the images bands in the printed image slightly offset toward two opposite edges of the lenticular sheet. The offset accommodates an anticipated viewing angle, and in practice may vary from one half of a lens width for very close viewing, to one tenth of a lens width, for very distant viewing.

In the practice of the invention, the interlaced image is printed on the flat reverse side of the lenticular material, and the interlaced image is applied in exact registration with the lenses. If the printer is provided with an opaque white ink channel, the printed interlaced image may be locally or entirely coated with a white layer. Once the printing of the desired color set is complete, the vacuum is removed, and the completed lenticular image lifted from the table of the flatbed printer.

The invention has been found to be self-correcting for slight imperfections in the manufacture of both the printer and the lens material. For example, the lens material may have slight inconsistencies, and the path of the printhead may depart from absolute linearity. However, since plastic lenticular material is somewhat compliant, and since the lines follow the actual path of the printhead rather than a linear ideal, the registration method of the present invention directly promotes the optimal condition for printing.

In practice, the positional accuracy is substantially more reliable than in previous approaches, so that lenses having finer pitches can be employed. Relatively thin, flexible, and inexpensive material may therefore be printed in relatively large formats while still retaining precise alignment. A practical result of the system of the invention is that its flexible, large format lenticular prints may be rolled for shipping, which simplifies handling and markedly reduces shipping costs for large-format lenticular images.

DETAILED DESCRIPTION OF CERTAIN EMBODIMENTS

Inkjet printheads typically include arrays of micromachined nozzles arranged on a regular geometrical lattice. In the industry, common nominal nozzle spacings include 300, 360, 600, and 720 nozzles per inch. The rows and columns of nozzles may be staggered or offset at the election of the manufacturer. Regardless, the output resolutions of inkjet printhead are effectively limited to multiples of the nozzle spacing.

For example, a nozzle array having 300 nozzles per inch may print at 300 dots per inch (DPI), 600 dpi, 900 dpi, 1200 dpi, 1500 dpi, 1800 dpi, 2100 dpi, 2400 dpi, etc. The effective resolution may be asymmetrical in the x and y axes. Commonly, the spatial frequency of droplet deposition is determined by differing mechanisms, since the ejection frequency and the droplet trajectory are of greater concern in the axis in which the printhead shuttles across the image.

For example, droplet ejection in the axis of travel of a moving printhead (by tradition the x axis) may be triggered by an optical sensor's interaction with an encoder strip carrying a closely spaced pattern of lines. In the raster axis perpendicular to the direction of travel (by tradition the y axis), the spatial frequency of the deposited droplet pattern is determined by the increment of relative linear motion. The linear motion is typically provided by stepper motors, actuators, belts, gears, and other translations of electrical power into linear activation.

Inkjet printers have either a fixed printhead or printhead array, or a traveling printhead or printhead array. The printable medium receiving the inkjet droplets may be either fixed, in which case the printhead must be transported across the image to produce an image, or the printable medium can be mechanically advanced, in which case, the printed image is generated by the progressive displacement of the material in relation to the device that ejects the pattern of droplets. Regardless of the mode of implementation, the completed droplet pattern making up the final image is substantially determined by the relative motion between the active inkjet nozzles and the printable medium.

In a typical roll-fed inkjet printer, a spool of paper or film is unwound and fed under a printhead. In a sheet-fed inkjet printer, sheets are successively drawn from a stack of paper or film and fed under a printhead. While these configurations may be envisioned as compatible with certain modifications of the invention, the invention is particularly adaptable for use in the category of inkjet printers known in the trade as flatbed printers.

The essential nature of a flatbed printer is that the printing device holds the material or object to be printed on or against a table as the printing is performed. Depending on the design of the printer, either the bed of the table is advanced under the ink source, or the ink source is moved over the material or object.

A flatbed's table may be outfitted with trays or holding jigs so that a plurality of items may be printed in an efficient, continuous operation. The items may be identical in size and design, or may vary across the printable area of the bed. Accommodations for such arrangements are commonly included in the software controls for the printer.

Flatbed inkjet printers are often designed to allow for the printhead to be raised over relatively thick materials. Maximum clearances of the printhead above the bed are commonly in the range of 70 mm to 100 mm.

This adaptability has been found useful in lenticular imaging, where the lenticular sheet used in large format images can be 4 mm thick or more. Furthermore, the ability of UV ink to adhere directly to plastic, without priming or other special preparation of the plastic, has been found, to a degree, to provide a technical pathway compatible with efficient and reliable lenticular printing.

However, as in all forms of lenticular printing, the quality of the viewed image is highly dependent on the successful correlation of the printed image with the periodic lenticular relief. If the lenses are not precisely parallel with the raster axis of the printer, a diagonal break will be seen in the finished image. If the lenses are parallel to the printer raster, but offset from the periodic printed pattern, the image transition will only be viewable at an oblique angle, and a centered viewing position will produce uncomfortable binocular rivalry, rather than the desired changeable or stereoscopic effect.

While some lenticular imaging systems, such as, helical platesetters and laser exposure systems for silver halide materials, can provide continuously variable resolution, this is possible in inkjet systems only when a single row of nozzles is active. In practice, therefore, any economically competitive inkjet system currently depends on the use of the resolutions inherent to the printhead and its driving electronics, and the language of the given printer's firmware and software.

In practice, therefore, there is typically a decorrelation between the spatial frequency of an inkjet device and the spatial frequency of any manufactured material. A lenticular sheet can be manufactured to match a device of fixed resolution. For example, a lens sheet having a nominal 60 lenses per inch can be produced to correlate with a 600 dpi printer, providing an integer number of views, namely ten, behind each lenticule. However, in practical lenticular printing, the spatial frequency of the lens array must be slightly lower than the spatial frequency of the interlaced image. This is required so that sight lines converge on the anticipated location of a viewer at a finite viewing distance.

When the resolution of the printing device is fixed, a lens sheet of differing manufacture would therefore be required for each viewing situation. In practice, this is cumbersome and economically prohibitive. Instead, the interlaced image is resampled, dithered, and rendered into printer language so that a frequency match between the lens and the fixed printer resolution is emulated through interpolation.

Because this interpolation process is continuously variable, it can accommodate any lens material and viewing condition. However, if arbitrarily implemented, such interpolation may yield lenticular prints of substandard quality. Common interpolative image processing defects include a loss of distinction between the different views, or distracting moiré banding in the observed image.

These interpolative image processing are used analogously in the generation of the raised reliefs used within the invention, although the raised lineated alignment pattern is not made a permanent part of the print. As with interpolative interlacing to make a lenticular image, it is typically advantageous to use relatively high image and printer resolutions in order to maximize the sampling rate and minimize interpolation losses.

For example, a lenticular material having a nominal 40 lenses per inch may have a measured physical pitch of 40.1 lenses per inch. Instead of 30 raster lines per lens, a 1200 DPI printer will deliver approximately 29.925 lines per lens.

In this case, because the alignment lines can be printed only at locations defined by the printer's raster grid, there must be a slight departure in the frequency from an integer ratio.

The following example considers binary color channels, which have been found to be consistently effective within the invention and directly compatible with the fixed inksets with which inkjet printers are commonly outfitted. A binary color channel instructs to the printer, at each set of raster coordinates at the assigned resolution, to either a deposit a droplet or leave the location blank. It should be appreciated that the invention may also be employed using grayscale data, and that grayscale files may be variously interpreted by drivers and dithering software.

It should also be appreciated that many printers use variable droplet sizes, so while the channel may be monochromatic, the density of the ink delivered to a given location may be governed by more complex instruction set. In the description and illustration of the invention, it should therefore be understood that a droplets of larger size or of mixed size may be substituted for any volumetrically comparable set of smaller droplets, and that these droplets may be diversely distributed either spatially or temporally, and not depart from the intended scope of the invention.

Accordingly, it may be appreciated that owing to the range of droplets volumes and sequences available to be delivered from the printhead, that the data provided to a given nozzle may be complex, and need not correspond to the simple on/off states associated with a simple binary instruction set.

For simplicity of description, however, the following example refers to binary data. In the above-recited case, while thirty lines would be printed for the majority of frequency cycles, approximately every thirteenth printed line would be assigned only twenty-nine lines. This adjustment represents a maximum variation in line pitch of 3.3% between any two neighboring lines in the alignment pattern.

In a complementary case, the lines themselves may be varied in width in the same proportion, so that the variation occurs in the lines themselves rather than in the unprinted region between them.

In a relatively simple embodiment of the invention, lines of a single width are used to make up the raised alignment pattern. In this case, the raised lines are deposited so that each raised lines contacts the surfaces two neighboring lenticules such that the region of lenticules that is engaged with the raised pattern is substantially kept from moving in the axis transverse to the linear axis of the lenticules.

It should be noted that in practice, frictional contact and the elective application of vacuum clamping will also discourage movement in the axis along the lenticules, although the relative location of the lenticular sheet and the alignment grid in the lengthwise axis is less critical to the comprehensive visual quality of the image.

The above-described case guarantees that the raised ridges formed during the deposition of the alignment grid will be formed with no more than a 3.3% variation in location between their peaks. In practice, it has been found that this slight level of frequency variation does not interfere with the efficacy of the invention. It should be noted that even this slight variation may be mitigated through resampling and interpolation.

Proceeding from the simple case in which the raised lines are of a common width, it may be appreciated that a layering of parallel lines of differing width, having a common but intermittently varied spatial frequency, may be made to conform more closely to the surface geometry of the lenticular sheet. Both the simple grid and the more complex layered grid will be subsequently described in reference to the drawings.

Referring now to the layered embodiment of alignment grid, it has been found such a series of superimposed lines of differing width may be implemented such that the raised ridges do not merely contact the lenticules at points of tangency to the lens relief, but instead substantially form a relief that is geometrically conformal to a region of the lens sheet.

As this arrangement provides contact at multiple surface locations between each lenticule and its corresponding pair of alignment ridges, positional accuracy, anchoring, and resistance to displacement are all increased over the simple case of a simple raised lines. In the invention, UV inks may be used in a conscientious way to shape the profile of the relief lines.

UV inks are typically nearly 100% solids. This class of inks is used on both permeable and impermeable media. While both have been successfully used within the invention, the most predictable relief profile is created upon relatively impermeable materials.

When a liquid droplet is deposited upon a substrate, surface tension induces the droplet to form a positive meniscus. Droplets may be isolated, or may contact one another and flow together prior to curing so that the meniscus is manly present at the edge of a microscopic pool of ink. This property in understood and can often be regulated by the controls provided with the printer.

For example, a printer with a transparent ink channel can often provide control over the reflectivity of the finished print. If the droplets are relatively small and isolated from one another, are cured with relative speed, the contact angle of the cured droplets will remain relatively steep, and the print will have a matte appearance. However, if the same transparent ink is used to deliver relatively large droplets, such that the droplets flow into one another, and those droplets are allowed to flow out prior to the application of curing radiation, the final surface will have a glossy appearance. This degree of control over the microscopic relief has been used compatibly within the invention to shape a relief that is complementary and effectively continuous with the relief of a region of the lenticular sheet.

In the invention, an ink is used to form convex relief lines that contact the convex lenticular lenses either conformally or at a sufficient number of locations of tangency to the lenses such that, once the vertices of the lenticules are set between raised lines having a the same spatial frequency as the lenses, the lenses are effectively held parallel to and in registration with the intrinsic path of the printhead.

Figure 1:
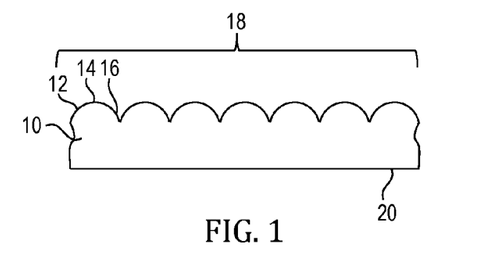
FIG. 1 shows a section of a sheet of lenticulated material compatible with the practice of the invention.

Referring now to the drawings, FIG. 1 shows a section of a sheet of lenticulated material compatible with the practice of the invention. Lenticulated material 10 includes a series of parallel convex cylindrical lenses 12, each lens having a lenticular 14, and each pair of neighboring lenses defining lenticular valley 16. A series of adjoining lenticules constitutes lenticular array relief 18. The reverse of the lenticular material 20 is typically located at or near the effective focal length of the lenticules. When a properly prepared image is printed or placed in registration with the lenticules, an image that changes with the viewing angle may be observed through the lenses.

Figure 2:
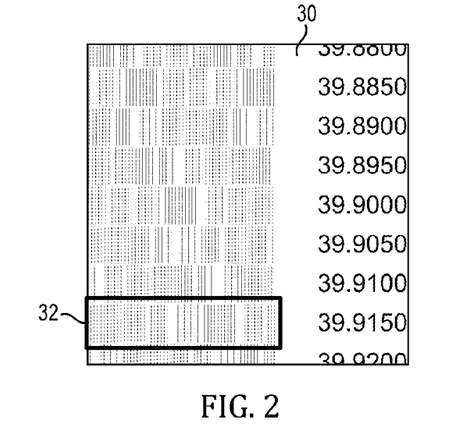
FIG. 2 shows a portion of a numerically bracketed spatial frequency pattern to be printed upon a lenticular sheet, highlighting a band that matches the physical pitch of the lenticular array.

FIG. 2 shows a portion of numerically bracketed spatial frequency pattern 30 to be printed upon a lenticular sheet for the evaluation of its physical pitch. Such patterns are commonly known as pitch tests, and typically include a range of lines printed at a progression of spatial frequencies close to the physical pitch of the lenticules in the lenticular material.

This spatial frequency pattern is used to identify two values that are relevant to the operation of the invention. The first is the physical pitch band 32 of the lenses, highlighted by the box in FIG. 2. The second is the viewing pitch band 34 of the lenses, highlighted by the box in FIG. 4.

The first value is selected by locating a sacrificial sheet of lenticulated material 10 upon the bed of the printer and printing the pitch test pattern directly on the lenticules. The lenticular sheet is aligned as nearly as possible to the axis of the printhead.

This may be achieved, for example, by printing a reference line along the bed of the printer. Lenticular sheet is typically provided with a known reference edge, so that the axis of the lenses may be mechanically aligned with a printing device. The sacrificial sheet is set with its reference edge aligned with the printed reference line, placing the lenticules substantially in line with the printhead's direction of travel. The sheet may be fixed in place with tape and a vacuum applied to hold the material flat upon the table.

A flatbed inkjet printer equipped with a vacuum table is useful within the invention, as the clearance between the sheet and the printhead and the lenticulated sheet can be relatively small, and the droplet deposition correspondingly precise, owing to the clamping force of the negative air pressure.

UV-curable inks can be adhered directly to glossy material, such as, plastic and glass. In the invention, the pitch test pattern is printed directly upon the relief face of the lenticulated material such that the lines within each band are parallel to the lenticules, and such that the band comprised of those lines is perpendicular to that lenticular axis.

The band observed to have the least deviation from the frequency of the lenticular relief identifies its physical pitch. The wider the sacrificial test sheet is in the cross-lens axis, the more accurate the value will be. The deviation between the lenticules and the pitch band is cumulative over the number of lenses that are printed with the calibration lines. Generally, the optimal pitch may be viewed by direct observation. However, computer vision systems may also be employed.

Figure 3:
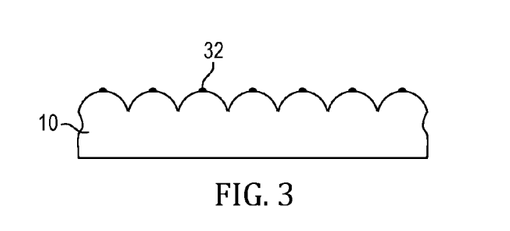
FIG. 3 shows the identification of physical lens pitch by the equidistance of the lenticules and the regularly spaced lines in one band among the set of printed pitch bands.

FIG. 3 shows this identification of physical lens pitch by the equidistance of the lenticules and the regularly spaced lines of the relevant printed pitch band. At this stage, the lenticular sheet has been made parallel to the printhead's axis of travel, but has not been aligned at a particular relative position across the lenses. Accordingly, the markings upon the lenses will not necessarily arrive upon the vertices of the lenticules as shown, and may be anywhere upon the surface geometry of the lenticule. However, the relevant pitch band is the one in which a line is in each instance printed at a geometrically similar location over the available span of lenticules.

Figure 4:
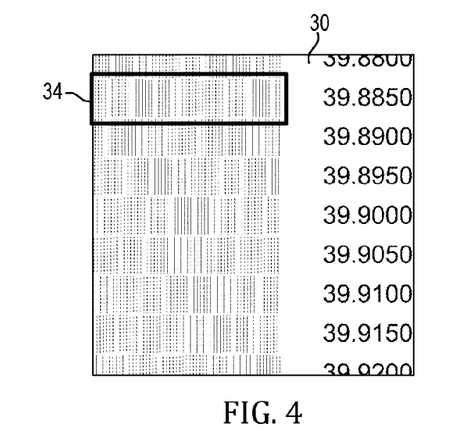
FIG. 4 shows a portion of the same numerically bracketed spatial frequency pattern depicted in FIG. 2, in this instance highlighting a band that matches the optimal pitch for a predetermined viewing distance.

FIG. 4 shows the same portion of a numerically bracketed spatial frequency pattern shown in FIG. 2, in this instance highlighting a band that matches the optimal pitch for a predetermined viewing distance. Generally, this pattern would be printed on a sheet of paper of film, and a clear sheet of lenticulated material placed over it. An observer then occupies the targeted viewing distance and empirically determines the band where a solid band appears. This process is well known to those practiced in the art of lenticular printing.

In the invention, the pitch value, conventionally measured in lenses per inch (LPI), is slightly higher for the physical lens pitch than for the viewing pitch, here suggested by the respective values of 39.915 LPI and 39.900 LPI. In a nominal 40 lpi lens material having a relatively short focal length, these values typically correspond to a viewing distance around two meters.

Figure 5:
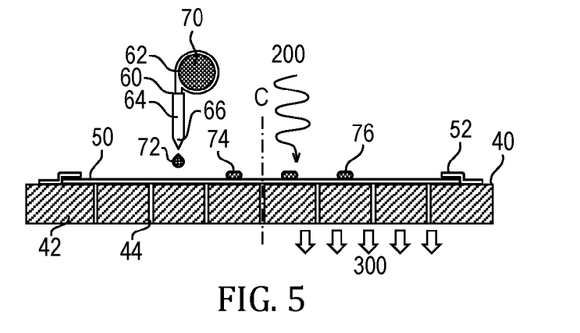
FIG. 5 shows a sectional view of a relatively simple raised grid being formed at the physical lens pitch, in accordance with the invention.

FIG. 5 shows a sectional view of a relatively simple raised grid being formed at the physical lens pitch, in accordance with the invention. Vacuum table 40 includes bed 42 which is formed having vacuum ports 44 though which vacuum force 300 may be applied.

Permeable sheet material 50 allows the vacuum force to hold the permeable sheet flat, while also allowing the vacuum effect to partially pass through. Examples of suitable air-permeable materials include building paper, craft paper, open cell foam, sacrificial CNC coverings using fused plastic beads, and apertured banner material.

Irrespective of the type of permeable sheet employed, the material may be affixed to the bed of the table using adhesive tape 52. The sheet of permeable material is dimensioned so that it is larger than the alignment grid that is to be printed. The raised grid may also be printed directly on the surface of the table, although this requires that the grid be manually removed each time the project requirements vary.

Apertured banner mesh having an open area of 12-20% has been found to be particularly applicable within the invention. Such banner mesh is often a woven material that has been coated in vinyl. The coating process is expressly performed so that the mesh retains minute openings so that air may pass through. In the invention, the mesh provides a printable surface that securely receives a raised printed pattern, while also allowing vacuum force to be applied to the lenticulated sheet through the printed mesh. AdMesh by Britten Studios (Traverse City, Mich., USA), having an open area of 16%, has been found suitable for use within the invention.

Once the permeable material is in place, an alignment grid, interlaced at the previously identified physical pitch of the lenticulated sheet, is electronically delivered to the printer and the pattern deposited upon the permeable substrate (sheet) 50 to a sufficient depth that a relief of raised lines is formed. Inkjet system 60 includes ink reservoir 62 which leads to printhead 64.

Printhead 64 includes at least one nozzle 66 capable of ejecting ink toward the bed of the printer. Ink reservoir 70 is in fluid communication with nozzle 66 such that liquid droplets 72 are sequentially ejected. Uncured graphic element 74 remains fluid until UV radiation 200 is applied to form cured graphic element 76. These droplets accumulate into a regular pattern of parallel lines that is intrinsically matched to the individual printer's raster, and which matches the physical pitch of the lenses.

Figure 6:
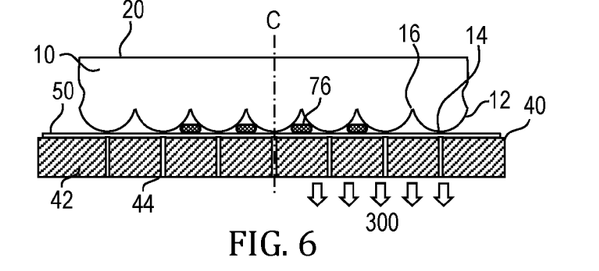
FIG. 6 shows the physical frequency match between the lenticulated face of the lens array and a printed alignment grid when the lenticulated sheet and the grid are engaged.

FIG. 6 shows the utility of the physical frequency match between the lenticulated face of the lens array and a printed alignment grid when the lenticulated sheet and the grid are engaged. A plurality of cured graphic elements 76 in the form of parallel lines, when printed to suitable thickness and width, deters any movement of the lenticulated sheet across the axis of the lenticules. The application of vacuum force 300 draws the lenticulated sheet to the permeable sheet, which is in turn held down on the printer table.

Furthermore, the grid pattern is effectively indexed to the printer's raster. Any location on the printer raster, within the resolution of the printer, may be chosen as the origin or as a reference axis. In the invention, it has been found useful to index both the grid and the image files at the center of the printable area of the device. Central index C is marked by a broken line in the figures. The location would typically be defined by the raster address at an elected resolution. For example, a flatbed printer having an addressable width of 1270 (50") would, at 1200 dpi, have a center at 635 mm (25"). The printer would then be instructed to center both the grid file and the interlaced image file at a location 30,000 pixels from the origin.

This alignment can be realized through the printer's software language. The grid is placed by the printer instructions so that the two centermost grid lines are equidistant from the elected central axis. Interlaced files are generated so that a central image field is evenly divided by the same central index value. In this manner, the vertices of the lenticules will rest between the raised grid lines, and the interlaced image will be centered on the indexed axis. When printed, the image bands will be naturally and progressively offset to each side of the image to generate an optimal visual effect at the elected viewing distance.

Figure 7:
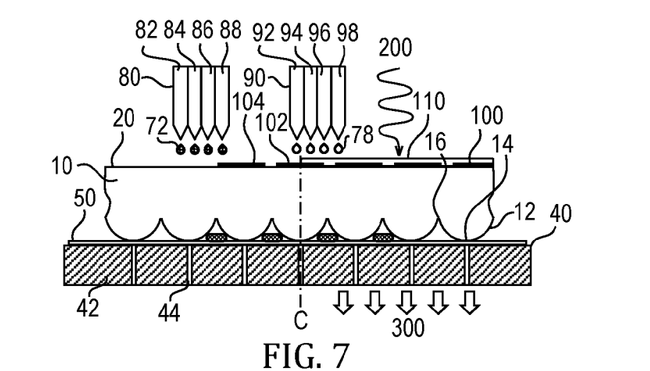
FIG. 7 shows the aligned printing of the interlace image fields upon the planar reverse side of the lenticulated sheet, using a known reference location from the previously printed alignment grid.

FIG. 7 shows the aligned printing of the interlace image fields upon the planar reverse side of the lenticulated sheet, using the known reference location from the previously printed alignment grid. It may be appreciated that the grid file and the interlaced image file share the same center at C.

Color ink printhead 80 includes a plurality of nozzle arrays. The nozzles within each array are typically disposed in a regular pattern. A monolithic printhead often receives a series of differing colored inks that are directed to the appropriate nozzles. An exemplary configuration for a four-channel system is cyan/magenta/yellow/black, or CMYK. Four discrete ink systems are indicated by first color ink channel 82, second color ink channel 84, third color ink channel 86, and fourth color ink channel 88.

Opaque white ink may be directed through multiple channels in order to accelerate deposition to a sufficient thickness to provide opacity. White ink often requires special treatment, such as periodic agitation, in order to keep its pigment in suspension. Accordingly, it may have its own printhead, ink supply, and controls, as indicated by white ink printhead 90. The white printhead here includes a plurality of nozzle arrays, indicated by first white ink channel 92, second white ink channel 94, third white ink channel 96, and fourth white ink channel 98.

The color printhead and the white printhead are typically mounted upon the same carriage, and may be fabricated to share a monolithically manufactured nozzle system.

FIG. 7 also shows the progression of nozzle arrays providing colored and white ink during the aligned printing of the interlace image fields. It may be seen that the raised grid securely locates the lens array so that it each lens may only seat itself in one location between and relative to any two raised grid lines.

Printed interlaced image 100 includes a plurality of interlaced image fields, here exemplified by the printing of centermost image field 102 and first offset image field 104 by color printhead 80. The concurrent printing of a backing layer of white ink is illustrated by the progression of white ink printhead 90. White ink layer 110 may also be printed in a separate operation.

Figure 8:
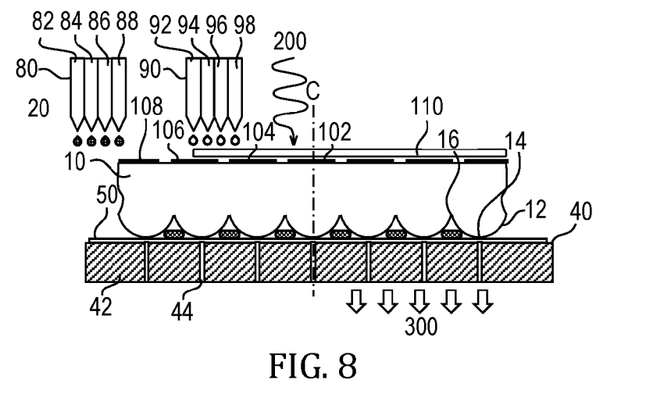
FIG. 8 shows the progression of nozzle arrays providing colored and white ink during the aligned printing of the interlace image fields.

FIG. 8 shows the movement of nozzle arrays providing colored and white ink during the aligned printing of the interlace image fields, and includes the progressive printing of second offset image field 106 and third offset image field 108. For clarity of description, the interlaced image fields are shown here as separate entities; however, in practice, the image fields would typically be printed in a continuous manner, with the individual fields distinguished only by their graphic content.

Once the printing operation is complete, the vacuum is switched off and the print removed from the table.

Figure 9:
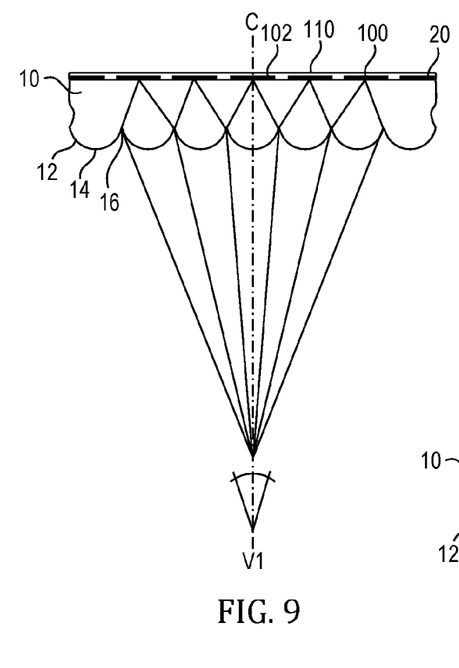
FIG. 9 shows the viewing of a lenticular print formed according to the invention in which the alignment grid shares a centerline with the centermost image field.

FIG. 9 shows the viewing of a lenticular print formed according to the invention in which the alignment grid shares a centerline with the centermost image field. A viewer located at central location V1 will see an accurately aligned lenticular image.

Figure 10:
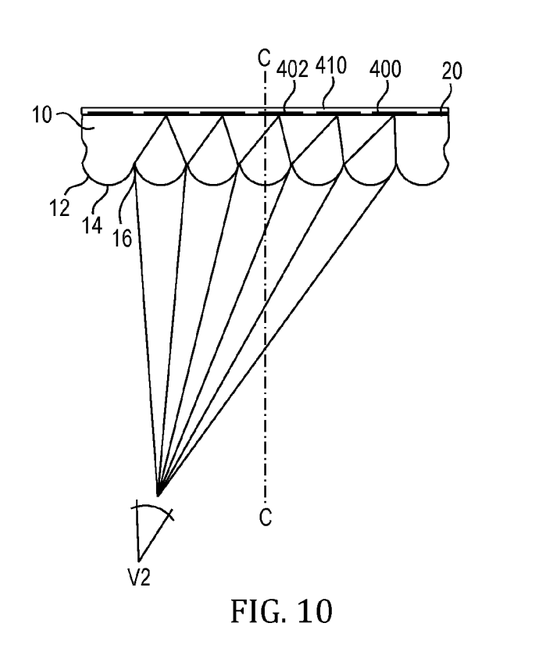
FIG. 10 shows the viewing of a lenticular print formed according to the invention in which the centermost image field of the interlaced print layer is expressly offset from the centerline of the corresponding alignment grid.

FIG. 10 shows the viewing of a lenticular print formed according to the invention in which offset centermost image field 402 of interlaced print layer 400 is expressly shifted from the centerline of the corresponding alignment grid, as are successive fields in a progressive manner. Offset image white ink layer 410 is analogous to white ink layer 110 in previous figures.

An offset interlaced image may be desirable when the print is to be located obliquely to the known path of the viewer, as indicated by offset viewer position V2. It may also be useful when a print is a component in a tiled series of prints that meet edge-to-edge, whenever the print is designed to be mounted at an off-center position.

When multiple contiguous panels are used to convey a single continuous visual impression, a positional offset may be allowed in the images so that the viewer's sightlines properly converge of the image fields. This may be achieved by interlacing a continuous image and dividing it, or by anticipating the tiled format, and shifting the relevant image fields as a function of the elected viewing pitch and the departure in the transverse axis from the expected viewing position.

For example, in a three-panel display, a conscientiously calculated shift toward the outermost edge of the right and left images will intrinsically align the sightlines of the three panels. A convenience of this image preparation is that the same alignment grid may be used for each of the panels in the series. The foregoing principles may be applied to any number of panels, and to panels of unequal width.

These understandings may be broadly applied within the invention, and it may be appreciated that within the practice of the invention, the alignment grid need not be exclusively employed to center the interlaced image upon the lens array.

Figure 11:
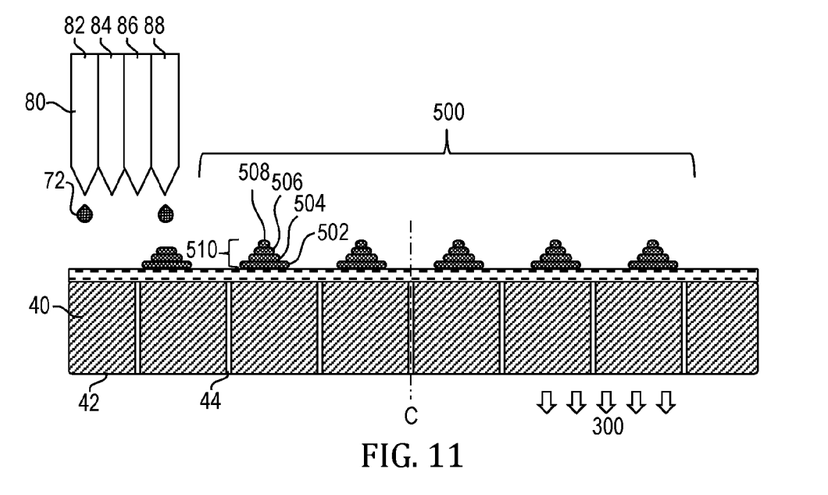
FIG. 11 shows a multilayer application of ink providing a quantized geometry complementary to the raised lenticular surface.

FIG. 11 shows a multilayer application of ink providing a quantized geometry complementary to the raised lenticular surface. A quantized geometry in the present instance is a relief feature built up from plural layers of ink activated by differing data presented while the printhead is traveling over a single location, so that the accumulation of ink can attain more complex geometries.

FIG. 11 shows such a layering of ink deposited in four steps by color ink channels within color ink printhead 80. Quantized alignment grid 500 includes a plurality of parallel quantized ridges 510. Each quantized ridge includes four layers of ink, each layer deposited to provide a different line width.

In the illustrated example, first line 502 is the widest, followed each time by a line of lessening width. Second line 504 is of decreased with, followed by third line 506. Fourth line 508 is the narrowest of the four. Each line may be addressed by multiple lines of printer data. The accumulated surface geometry may be further understood by concurrent reference to FIGS. 13 and 14.

Figure 12:
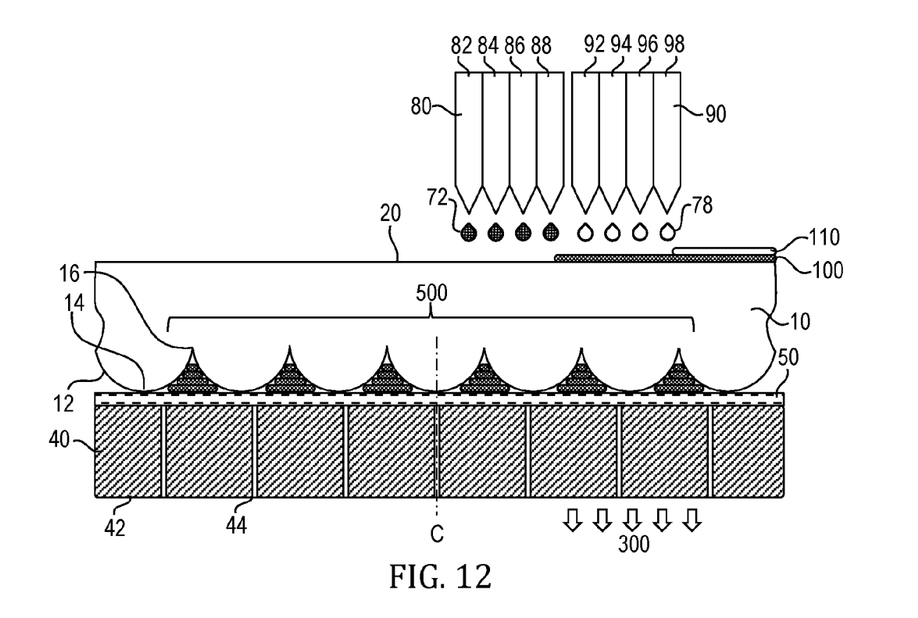
FIG. 12 shows the spatial frequency match between the lenticulated face of the lens array and a quantized printed alignment grid, and furthermore showing a printing operation in progress.

FIG. 12 shows the spatial frequency match between the lenticulated face of the lens array and a quantized printed alignment grid, and furthermore showing a printing operation in progress. It may be appreciated from the figure that each ridge in quantized alignment grid 500 provides multiple contact locations upon lenticules 12. Printing proceeds is a manner analogous to that shown in previous figures.

Figure 13:
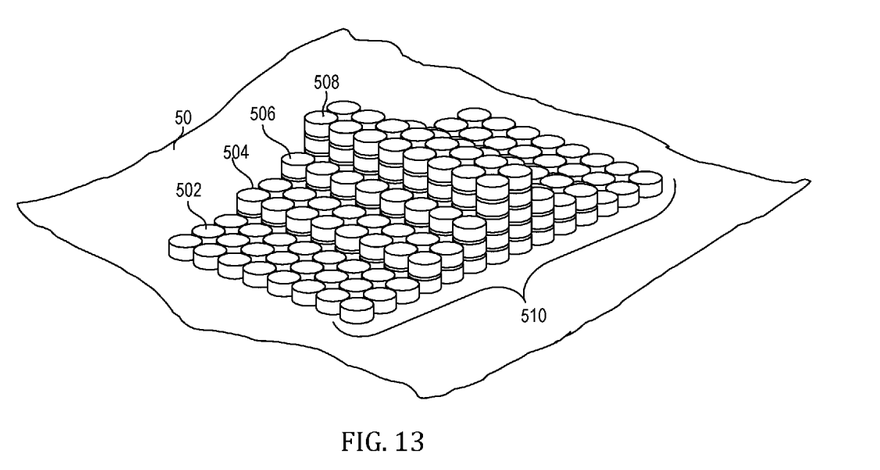
FIG. 13 is a schematic perspective view showing a detail of the buildup of ink layers forming a quantized alignment feature.

FIG. 13 is a schematic perspective view showing a detail of the buildup of ink layers forming a quantized alignment feature. The shallow cylinders represent the locations of droplets upon the printer's raster. In practice, the droplets would be fused into a more continuous surface shape owing to surface tension and flowout between the individual droplets.

It may be seen from the figure that each layer of ink is formed by the deposition of a plurality of rows of droplets. First line 502 includes fourteen rows of droplets. Second line 504 includes eight rows of droplets. Third line 506 includes four rows of droplets. Fourth line 508 includes two droplets. The accumulation of these four lines of varying width forms quantized ridge 510.

Figure 14:
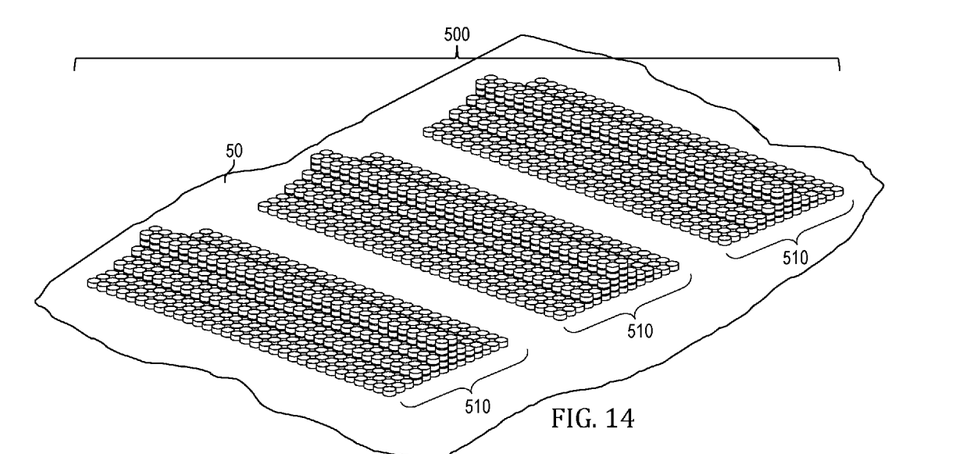
FIG. 14 is a schematic perspective view showing a detail of the buildup of ink layers forming a region of a quantized alignment grid.

FIG. 14 is a schematic perspective view showing a series of quantized ridges 510, collectively forming quantized alignment grid 500. It may be appreciated that convex cylindrical lenticules will seat directly into the complementary geometry of the quantized alignment grid.

Figure 15:
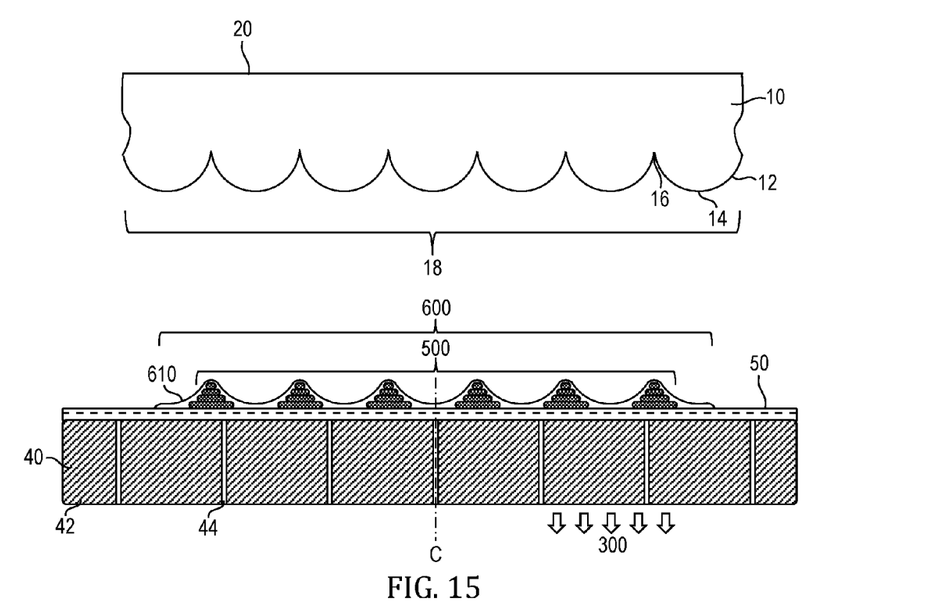
FIG. 15 shows a multilayer application of ink having a further layer providing a coating over the previously deposited quantized ink layers, such that the relief surface of the alignment grid is made substantially conformal to the anticipated lenticular surface.

FIG. 15 shows a multilayer application of ink having a further layer including selective coating 610 over the previously deposited quantized ink layers 500, such that the relief surface of the alignment grid is made substantially conformal to the anticipated lenticular surface.

Flatbed inkjet printers outfitted for use with UV-curable inks often include a clear varnish or primer formulated to flow out into a high gloss finish. Such an ink subsystem may be employed to coat the accumulated quantized ink layers so that the finished ridges acquire a more continuous surface geometry, as depicted by conformal alignment grid 600.

Figure 16:
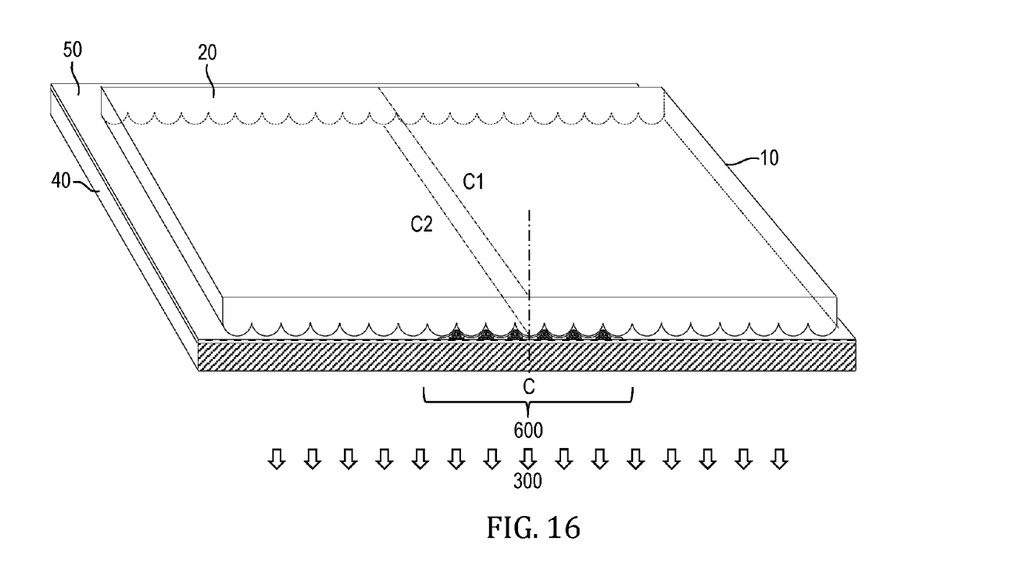
FIG. 16 shows a lenticular sheet in alignment with a central registration grid formed according to the invention.

FIG. 16 shows a lenticular sheet in alignment with a conformal alignment grid formed according to the invention. It may be seen that center axis C defines parallel linear axes C1 and C2 upon the lenticulated sheet, and therefore registers the lenticular relief pattern with a known index upon the planar back side of the sheet.

Figure 17:
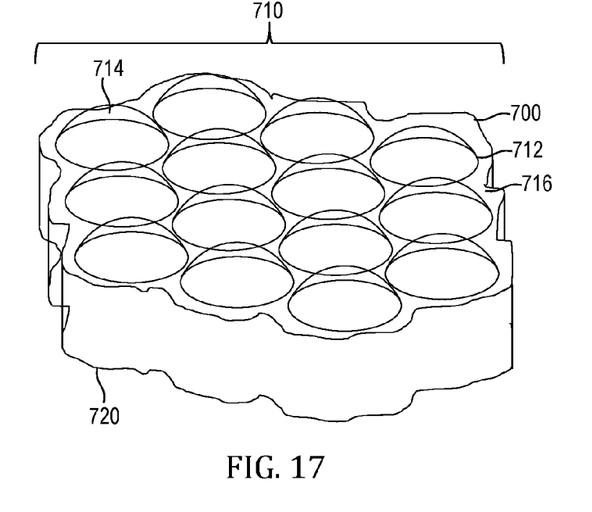
FIG. 17 shows schematic perspective view of region of a spherical lens array sheet.

FIG. 17 shows a modification of the invention for spherical lens arrays. Spherical lens arrays may be used for full-parallax 3D imaging, or various other variable effects. In the schematic perspective view of region of a spherical lens array sheet, the lens array sheet 700 carries an arrangement of spherical lenses 710 having convex apertures 712, each having a vertex 714. Lens interstices 716 are located between lenses, and may be either a geometrical cusp provided by the intersecting convex lens geometries, or a flat land, as shown. Lens array sheet 700 is provided with planar array reverse 720.

Figure 18:
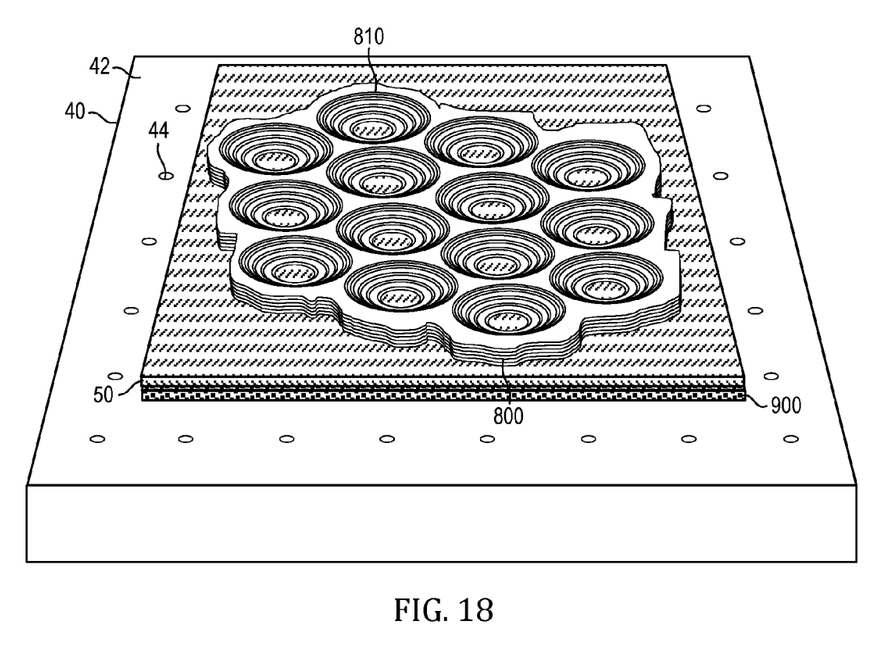
FIG. 18 shows a schematic perspective view of an alignment relief pattern complementary to the lens array shown in FIG. 17, the illustrated system including both an air-permeable, sacrificial substrate and an ink catchment layer.

FIG. 18 shows a schematic perspective view of an alignment relief pattern complementary to the lens array shown in FIG. 17, the illustrated system further including both an air-permeable, sacrificial substrate and an ink catchment layer. It may be understood by reference to the figure that the invention may be adapted to position a prefabricated relief material and secure its location relative to the known printer raster in two axes.

Concave alignment grid 800 includes a plurality of quantized concavities 810 formed by the progressive printing of ink layers in which circular regions of varying dimension are conscientiously left unprinted. An approximate inverse geometry of the spherical lens array may be generated in this manner, and the spherical lens array material thereby secured in a known position by engagement of the convex lens aperture with the corresponding concavities in the grid. During subsequent printing, lens field may be aligned and offset in a manner analogous to the description of the lenticular case.

This figure also illustrates a feature that assists in the care and maintenance of the vacuum table in its use within the invention. Apertured mesh and other sacrificial permeable material can allow small droplets to be drawn into vacuum ports 44. Catchment layer 900 is provided to capture stray droplets before they are drawn into the vacuum ports.

The catchment layer may be made of air-permeable nonwoven material of sufficient thickness and fineness that any stray droplets are trapped in their intertwined fibers before that can be drawn into the vacuum ports. A nonwoven spunlace without through-holes may be employed in this capacity.

Operation of the Invention

In the use of the invention, lenticular material may simply be laid upon the set of lines until tactile confirmation of alignment is felt by the operator. Assuming the alignment lines have been printed to contrast with their background, and in spite of the fact that the lenses are facing downward onto the bed, there will often be a visible banding or variation in tone when the lenses are imperfectly aligned.

In the more detailed embodiment of the invention an inkset including a series of inks is used to build a relief profile that progressively conforms to surface relief of the lens array yield a concavely fluted surface that precisely conforms to the convex lenticules. The progressive accumulation of ink patterns can be tailored to the pitch and curvature of the lens being used, and can provide optimal engagement for a given optical sheet material.

Because most inkjet printers in the graphic arts are designed to print in color, there will typically be a set of nozzle arrays dedicated to each fluid source. These sources are not limited to pigmented or dyed inks, but may also include curable primers, coatings or varnishes. In any case, it may be appreciated that the invention may be implemented using various interoperable sequences of deposition. In any case, it is advantageous to the productivity of the present alignment system that a plurality of lines of differing width can be deposited in a single pass of the printhead.

In the use of the invention, it has been found that his pattern of raised lines need not occupy the entire anticipated area of the printed lenticular sheet, but may be confined, advantageously, to a central band. In practice, a pattern of lines 100 mm wide has been found consistently effective for images to one meter in width and over. The band of raised lines is typically made to extend the length of the anticipated lenticular sheet in the direction parallel to the lenses, although this full length not strictly necessary.

Additionally, the invention departs from graphic arts convention in that the geometrical origins of the image files associated with the image, namely, the linear grid file and the interlaced image file, are not located at the upper left corner of the images, as they would be by tradition.

Instead, a common origin in the axis along the lenses is defined in the vicinity of the centerline of the images in the axis parallel to the lenticules. By this method, for example, a central interlaced image band can be precisely and reliably located and printed upon the back of the lenticular array relative to the layered relief line pattern with which it is physically engaged. The printed interlaced image will then be optimally aligned with a viewer located directly in front of the image.

This relative centration is property introduced into both the digital files and the physically printed image. The alignment of the images and the grid data may electively be performed at various stages of the prepress operations. For example, the two cooperating files may be generated within a lenticular interlacing software application. Alternately, the coordination of the grid and image files may be performed during rendering by a rasterizing image processing (RIP) application. In digital imaging, software RIPs translate image, color, and ink density data into the instructions that directly control ink deposition.

One advantage of the establishment of a central origin is that the grid file may be generated having only the width of the line pattern necessary for making a successful alignment between the raised line pattern and the image. For example, the interlaced image file may be 1000 mm in width, while the grid pattern often need only be in the range of 100 mm. The null data that would otherwise occupy the area between the edge of the grid's digital file is therefore eliminated, and the size of the file is decreased, while data transfer rates to the printer are relatively rapid.

This consideration is especially meaningful, given that lenticular imaging often requires that a printing device be operated at its maximum resolution, at least in the axis across the lenses. This high-resolution requirement is the result of the optical division of the printed image by the lenticular array into separate views. The amount of depth or animation in the viewed image is directly related to the number of distinct lines of printed matter that can be delivered with the optical image field of each lens.

Indeed, this requirement can be so great that, in large format lenticular imaging, the image data may exceed the maximum file size allowed by standard file formats. For example, a TIFF (tagged information file format) image file by definition cannot exceed 4 gigabytes, yet, at 1200×1200 dpi, this volume of data will yield an image less than a meter square. Both flatbed printers and lenticular sheet are available with printable areas of several meters.

Furthermore, much of the resolution in the axis of the lens which does not provide any optical expansion is superfluous to the ultimate viewer. A conventionally, symmetrically processed image printed at 1200×1200 dpi on the reverse of a lenticular sheet having a pitch of 40 lenses per inch, will provide an observed resolution of 40×1200 dpi. The human eye cannot average such extremely asymmetric resolution, so main result of the high resolution in a symmetrically processed image is to slow image processing, image transfer, print cycle time, and to impose a ceiling on the maximum print area.

In cooperative use within the invention, the interlaced image is rendered so as to have an asymmetric resolution. Namely, the resolution of the interlaced file is limited in the axis along the lenses to a lower numerical value. This lower value is typically elected to be an integer function with the printhead's nozzle pitch.

For example, rather than matching a native 1200×1200 dpi addressable resolution, the image resolution may be specified to be 1200×600 dpi, 1200×300 dpi, or 1200×150 dpi. These asymmetric image files allow a single TIFF file to print images, respectively, of about two, four, and eight square meters.

This asymmetric file handling strategy therefore extends detailed multiview lenticular printing to the full dimension of most large-format flatbed printers. It also extends the market reach of this class of printer from poster-sized images to wall-sized images, and allows the use of the full dimensional range of currently available lenticular material.

Modification, Ramifications, and Scope

The principles invention may be applied to relief patterned objects other than lenticular arrays. Indeed, any prefabricated object carrying a relief pattern upon one of its faces can, through the application of the invention, be printed in registration with that relief pattern. Registered printing is reliably carried out upon a face opposite to the face upon which the relief pattern is formed by printing a raised alignment pattern defined by a pattern of relief features upon a bearing surface, such as the flat bed of a printer or a covering thereof, that inversely corresponds to the geometry of the relief patterned surface of the object.

During printing, the patterned object is held down to the bed and deterred from movement in a plane parallel to the bed of the flatbed printing device by the inverse relief features. The printed relief mechanically engages with the surface relief pattern upon the object, such that the relative positions of the patterned object and the alignment pattern printed upon the bearing surface are substantially constrained.

Diverse applications of this principle may readily be imagined. For example, it is often useful for a circuit board or a flexible conductive film to carry a wiring pattern on both sides. A printer may be used to generate a relief on one side of an electronic panel. The resulting printed relief may be, for example, composed of resist or of conductive ink. The relief may also result from selective etching of a layer of the material.

In any case, a corresponding inverse pattern may be printed on the bearing surface, and a series of geometrically commensurate relief-patterned items then physically engaged with the inverse pattern and printed while in a registered condition. Such a system can be used for electronic applications, such as visual displays and solar panels, which commonly require conductive matrices on both sides of a panel.

The invention may be applied to disciplines other than display optics or electronics. The prefabricated relief surface may be formed any practical method, including by forging, stamping, embossing, molding, or extrusion.

The alignment function of the invention is expected to be applied variously in any application where there is visual or functional utility in the alignment of printed surfaces located on two opposite sides of a prefabricated sheet of material.

Accordingly, the relief surface engaged with the alignment grid or pattern may itself be formed by relief printing, or may, alternately, be prefabricated by means such as extrusion, compression molding, embossing, film casting, or injection molding.

In the case of changeable imagery using in conjunction with a periodic refractive array, printing need not be limited to pigmented inks, but may include the use of transparent, translucent, color-filtering, iridescent, or reflective material, or whole or partial patterns thereof. These patterns may be derived by lenticular interlacing, and by successive applications of material of similar or differing layouts or compositions.

For example, prior to the application of interlaced, printed imagery, a transparent relief may be applied stepwise in a repeated, raised sequence of differing patterns that ultimately approximates the true focal surfaces of the lenticular lenses. This surface is readily modeled with optical design software.

The focal surface of a given lenticular lens is, substantially, a surface of cylindrical geometry having a radius between two and four times the radius of the refracting lenticular lens. It therefore locally departs from the conventionally planar back surface of the lenticular sheet at a spatial period roughly equal to the pitch of the lenses.

This condition is present in every lenticular system, but the requisite compensating relief is most significant when the included arc of the primary lens surface is relatively large. Irrespective of the lenticular lens curvature, an appropriately curved focal surface can provide improved view distinction and, in the case of an image seeking a 3D effect, greater rendering of depth. Functionally, it can also reduce the thickness of the elected lenticular sheet, since a primary lens aberration can effectively be eliminated.

Furthermore, and as indicated above, lenticular imaging is not limited to opaque imagery printed upon a flat surface. Indeed, imagery disposed at or near the focal regions need not be limited to either a flat surface, or to locally curved focal fields. For example, seemingly bas-relief subject matter may be displayed to a viewer by using a sequence of one or more interlaced image channels to form a physically incused pattern that then may be filled with tinted or colored ink.

The incused graphic devices may be built from a sequence of layers, and the detail, texture, and acuteness of the surface geometry of relief image elements may be regulated by both the digital input files, and the deposition and curing method of inks or localized transparent coatings. As in prior descriptions, in a UV-curing print system, the flowout of fluidic materials may be controlled by the timing and intensity of the applied actinic radiation.

In a further variation of such an application, opaque ink may be used to fill the incused transparent surface to impart an interlaced pattern that provides an illusionistic visual relief when viewed from the lenticulated side of the sheet. Any relief or texture applied near the focal surface is inherited by the composite image reconstructed by the lenticular array. The reconstructed relief image can then not only reproduce differences in pigmented imagery, but can, to a degree, respond to the modeling of its highlights and shadows by directional ambient lighting sources.

More comprehensively, the printing upon the planar reverse of the lenticulated sheet may be broadly envisioned as a volume having a resolution in the z-axis, as well as the axes defining the physical back plane. Accordingly, any microstructured optical pattern within the resolution and deposition capacity of the printing device may be cumulatively deposited within a transparent matrix. Subjects, emblems, or indicia of any sort may therefore be given the semblance of elevation or detachment from the visually rearmost surface.

The use of a transparent matrix is helpful in supporting features having a high aspect-ratio in the z-axis, and provides the advantage of optical coupling between the sheet material and transparent ink. However, it is envisioned that functional freestanding functional features are enabled by the invention. These may be the result of the direct accumulation of printable fluid into a cured relief, or may be cured, for example, in a soluble sacrificial matrix.

Furthermore, the use of a soluble support matrix having a differing chemical resistance to a solvent than the retained relief features allows structures such as cantilevers, bridges, valves, and crossing, interconnected, or insulated circuitry to be composed in any attainable axis. Such an application can foreseeably be used for localized illumination of an image, or in an updateable graphic display.

Conventionally, the continuous image plane of a lenticular image is located so as to intercept, in the nearest approximation, the inherently curved focal surfaces of the lenticular array. The image is conventionally interlaced with the assumption that the lens is operating at infinite magnification. However, even in an optically ideal case, lenticular lens will exhibit some variations in magnification. Some of these variations will occur when the practical focal length of the lens intercepts a volumetrically printed image, as previously described.

Accordingly, the scaling of interlaced imagery in the z plane can be made to vary in inverse proportion to the lenticular magnification at any point in the volumetric image field. By this method, the reconstructed image seen by an observer can retain the natural proportions of the intended subject matter.

Furthermore, where a volumetric image is intersected by the curved focal surface of a lens, any portion of the volumetric image ahead of the focal length will not be inverted by the lens, while the portion behind the focal length will be. Volumetric image elements located short of the focal length are projected at a finite magnification behind the image plane, while volumetric image elements located beyond the focal length are inverted and projected at a finite magnification ahead of the physical image plane. Therefore, the optimized processing of a volumetric image described herein should ideally accommodate any resulting variations in magnification, image orientation, and parallax.

US Application 20020114078, incorporated herein by reference in its entirety, disclosed how the focus of both lenticular (one-dimensional) and microlens (two-dimensional) lens array displays can be moved away from the conventional locations in order to optimize the design of the display so as to match the characteristics of the object being displayed and the display itself. The factors involved included the design of lens array, the resolution of the image recorded on its backplane, and the three-dimensional resolution of the object being displayed.

The present invention includes extensions of these understandings enabled by the additional degrees of freedom allowed by the capability and adaptability of the printing method of the present invention. The present invention allows the pigmented component of a printed interlaced image, whether imparted superficially or volumetrically, to optimally cooperate with the refractive geometry of the elected lens array. The refractive array may electively be composed of either lenticular or microlens elements, or any intermediate or combinatory form thereof.

The figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A printing system capable of accurately positioning a lenticular array in registration with a rectilinear raster comprising:
    a printer that is capable of printing onto a printable surface, the printer having a main support surface on which the printable surface rests; and
    a series of raised parallel relief features being spatially formed along the printable substrate that is supported by the main support surface, wherein the raised parallel relief features are raised to a sufficient height above the printable substrate such that when the lenticular array is disposed upon the raised parallel relief features, each raised parallel relief feature fits and is disposed within a valley formed between two respective adjoining lenticules of the lenticular array;
    wherein the series of raised parallel relief features are formed by the printer;
    wherein the main support surface comprises a vacuum table.

2. The printing system of claim 1, wherein the printer comprises a flatbed printer and the main support surface comprises a planar surface.

3. The printing system of claim 1, wherein the printer comprises:
    at least one ink reservoir;
    a printhead capable of ejecting ink onto the printable surface, the printhead including at least one nozzle;
    a mechanical actuation system configured to move the printhead in at least one axis; and
    an electronic system regulating motion of the printhead.

4. The printing system of claim 1, wherein the printable substrate is detachably secured to a portion of the main support surface of the printer.

5. The printing system of claim 4, wherein the printable substrate is detachably secured to the portion of the main support surface by tape along edges of the printable substrate.

6. The printing system of claim 1, wherein the series of raised parallel relief features are formed of UV curable inks deposited on the printable substrate by the printer.

7. The printing system of claim 1, wherein a lenticulated face of the lenticular array has a physical pitch associated therewith and the series of raised parallel relief features has a pitch substantially equal to the physical pitch of the lenticulated surface.

8. The printing system of claim 1, wherein the printable substrate comprises the main support surface of the printer.

9. The printing system of claim 1, wherein the series of raised parallel relief features comprise raised ridges that do not merely contact the lenticules at points of tangency to the lens relief but instead substantially form a relief that is geometrically conformal to a region of a lens sheet that is part of the lenticular array.

10. The printing system of claim 1, wherein the printable substrate comprises an apertured banner mesh.

11. The printing system of claim 1, wherein the series of raised parallel features is intrinsically matched to a raster of the printer and also at least substantially matches a physical pitch of lenses of a lenticulated sheet that defines the lenticular array, the series of raised parallel lines deterring movement of the lenticulated sheet across an axis of the lenticules.

12. The printing system of claim 1, wherein the series of raised parallel features comprises a relief structure in the form of quantized ridges formed by a multilayer application of ink that provides a quantized geometry that is complementary to a raised lenticular surface of the lenticular array.

13. The printing system of claim 12, wherein each quantized ridge is formed of a plurality of layers of ink, each ink layer deposited to provide a different line width.

14. The printing system of claim 13, further comprising a coating disposed over the quantized ridges such that the raised parallel relief features are conformal to the lenticules of the lenticular array.

15. The printing system of claim 13, wherein each of the plurality of layers of ink is formed of a plurality of deposited droplets that fuse to one another to form a continuous layer and the quantized ridge provides multiple contact locations upon the lenticules.

16. The printing system of claim 1, wherein the printer comprises:
    at least one ink reservoir;
    a color printhead capable of ejecting colored ink onto the printable surface, the color printhead including at least one nozzle;
    a white printhead capable of ejecting white ink onto the printable surface, the white printhead including at least one nozzle and being separate from the color printhead;
    a mechanical actuation system configured to move each of the color printhead and white printhead in at least one axis; and
    an electronic system regulating motion of the color printhead and white printhead.

17. The printing system of claim 1, wherein the series of raised parallel relief features are formed along the printable substrate such that the raised parallel relief features are confined only to a central band of the lenticules of the lenticular array with marginal portions of the lenticular array being unrestricted and spaced from the raised parallel relief features.

18. The printing system of claim 1, wherein the lenticular array includes an interlaced image and the printer is configured such that the interlaced image is rendered so as to have an asymmetric resolution in that the resolution of the interlaced file is limited in an axis along the lenticules to a lower numerical value which is selected to be an integer function of a pitch of a nozzle of a printhead of the printer.

19. The printing system of claim 1, wherein the printer is configured to both form the series of raised parallel relief features and form a printed interlaced image on the lenticular array after formation of the series of raised parallel relief features.

20. A printing system capable of accurately positioning a lenticular array in registration with a rectilinear raster comprising:

a printer that is capable of printing onto a printable surface, the printer having a main support surface on which the printable surface rests; and a series of raised parallel relief features being spatially formed along the printable substrate that is supported by the main support surface, wherein the raised parallel relief features are raised to a sufficient height above the printable substrate such that when the lenticular array is disposed upon the raised parallel relief features, each raised parallel relief feature fits and is disposed within a valley formed between two respective adjoining lenticules of the lenticular array;

wherein the printable substrate comprises a sacrificial substrate that is formed of a material that is at least partially permeable to air and the main support surface comprises a vacuum table.

21. A printing system capable of accurately positioning a spherical lens array in registration with a rectilinear raster comprising:

a printer that is capable of printing onto a printable surface, the printer having a main support surface on which the printable surface rests; and a plurality of quantized concavities being spatially formed along a printable substrate that is supported by the main support surface, wherein the quantized concavities are constructed such that when the spherical lens array is disposed upon the quantized concavities, each spherical lens fits and is disposed within one respective quantized concavity formed on the printable substrate, thereby locating and deterring movement of the spherical lens array relative to the main support surface;

wherein the plurality of quantized concavities are formed by the printer.

22. A printing system capable of accurately positioning a lenticular array in registration with a rectilinear raster comprising:

a printer that is capable of printing onto a printable surface, the printer having a main support surface on which the printable surface rests; and a series of raised parallel relief features being spatially formed along the printable substrate that is supported by the main support surface, wherein the raised parallel relief features are raised to a sufficient height above the printable substrate such that when the lenticular array is disposed upon the raised parallel relief features, each raised parallel relief feature fits and is disposed within a valley formed between two respective adjoining lenticules of the lenticular array;

wherein the series of raised parallel relief features are formed by the printer.

* * * * *